United States Patent
Berens et al.

[11] 3,743,305
[45] July 3, 1973

[54] SHAFT SEAL WITH EXPANDABLE OUTER PERIPHERY

[75] Inventors: Alfred S. Berens, Farmington; Dean R. Bainard, Novi; George L. Corsi, Southfield, all of Mich.

[73] Assignee: Federal-Mogul Corporation, Southfield, Mich.

[22] Filed: April 7, 1971

[21] Appl. No.: 132,091

Related U.S. Application Data

[62] Division of Ser. No. 12,563, Feb. 19, 1970, Pat. No. 3,614,183.

[52] U.S. Cl. .................. 277/37, 277/182, 277/189
[51] Int. Cl. ........................ F16j 15/32, F16c 33/76
[58] Field of Search........ 277/182, 37, 179, 189, 153; 308/187.1, 187

[56] References Cited

UNITED STATES PATENTS

| | | | |
|---|---|---|---|
| 3,531,168 | 9/1970 | Bainard | 277/37 X |
| 3,306,683 | 2/1967 | Deuring | 277/37 |
| 2,868,566 | 1/1959 | Kosatka | 277/182 |

*Primary Examiner*—Samuel B. Rothberg
*Attorney*—Owen, Wickersham & Erickson

[57] ABSTRACT

A rigid reinforcing member has a cylindrical portion slip-fitting in the bore and an inwardly extending radial flange. An elastomeric sealing lip is supported for shaft contact by the radial flange while a cylindrical flexing gasket is supported by the cylindrical portion and extends beyond it. A separate rigid ring slip-fits inside the rigid reinforcing member and engages the flexing gasket. When force is exerted axially against the radial flange in one direction and against the separate ring in the other, the gasket is forced out into sealing engagement with the bore wall.

8 Claims, 14 Drawing Figures

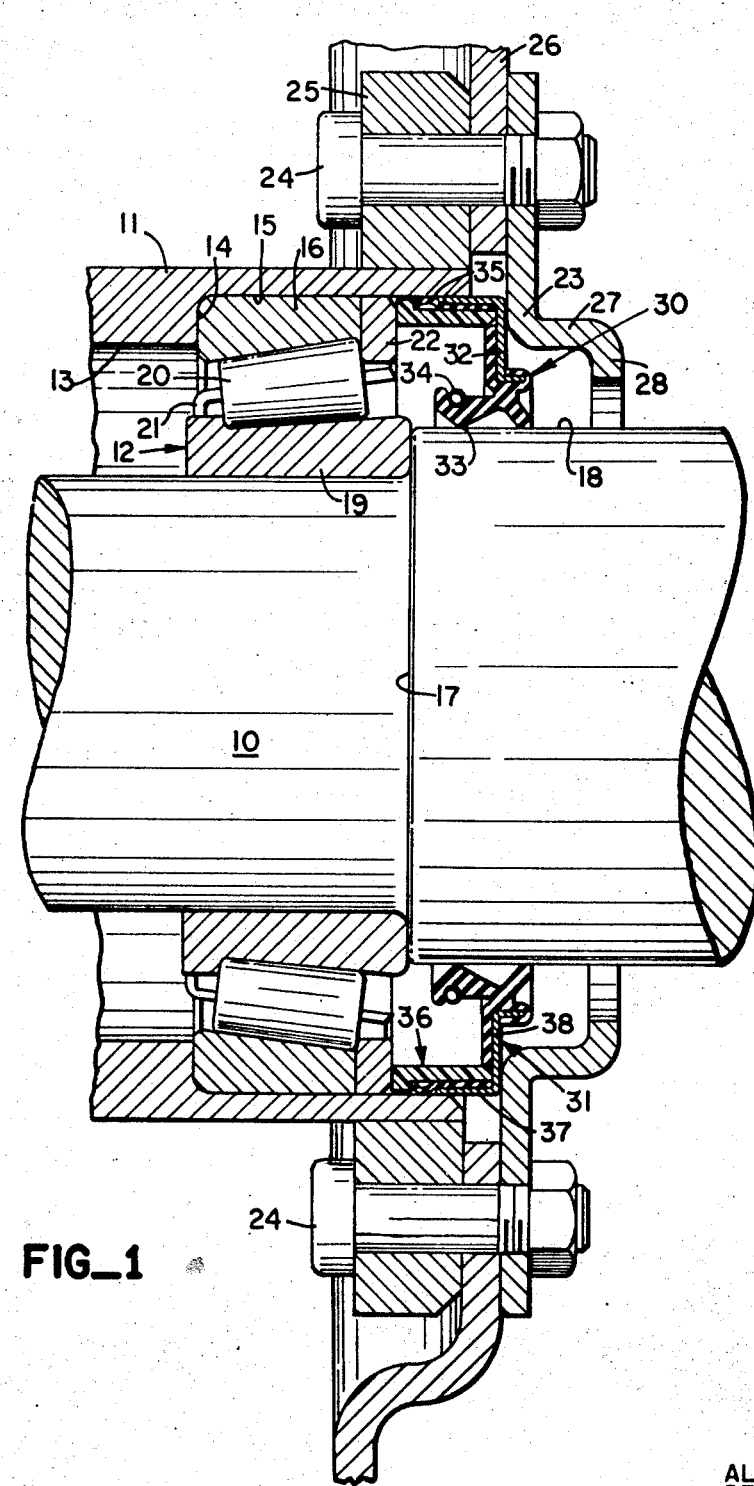
FIG_1
INVENTORS
ALFRED S. BERENS
DEAN R. BAINARD
GEORGE L. CORSI
ATTORNEYS

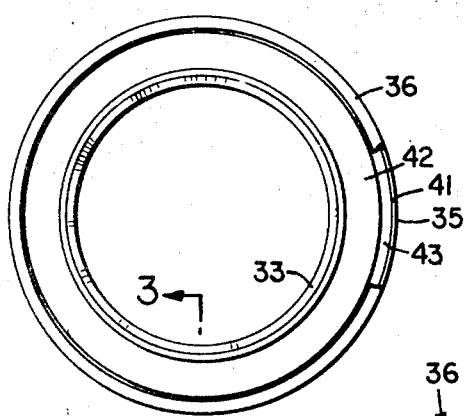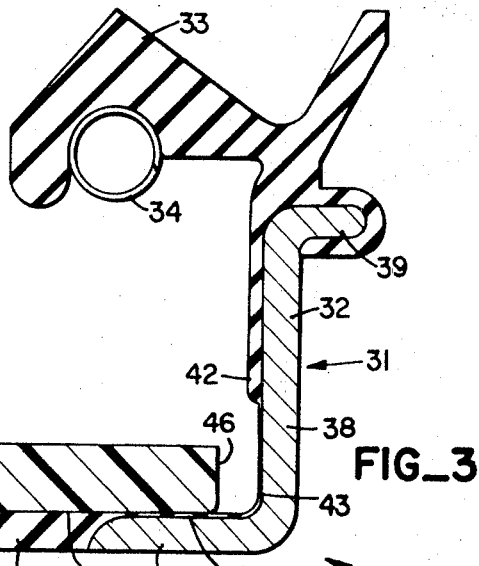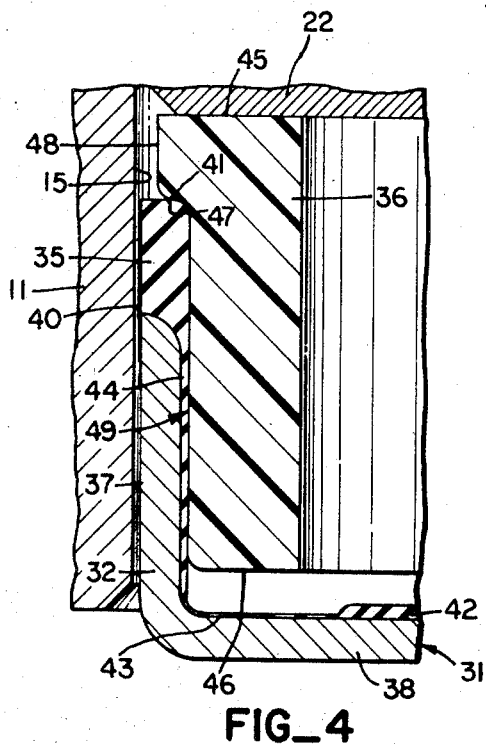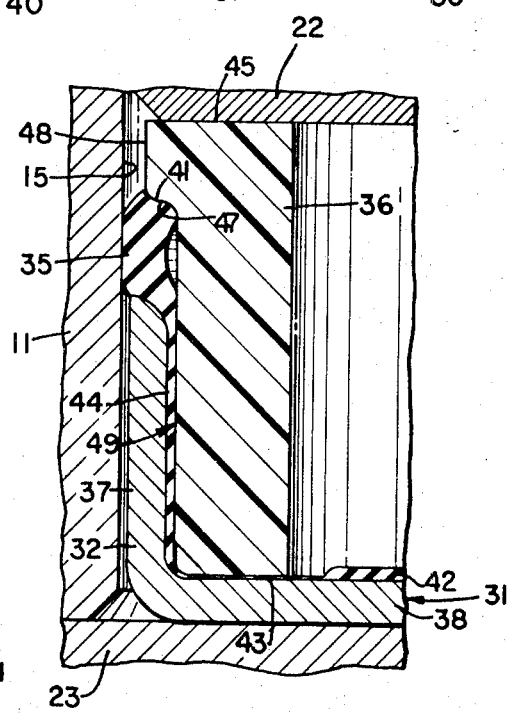

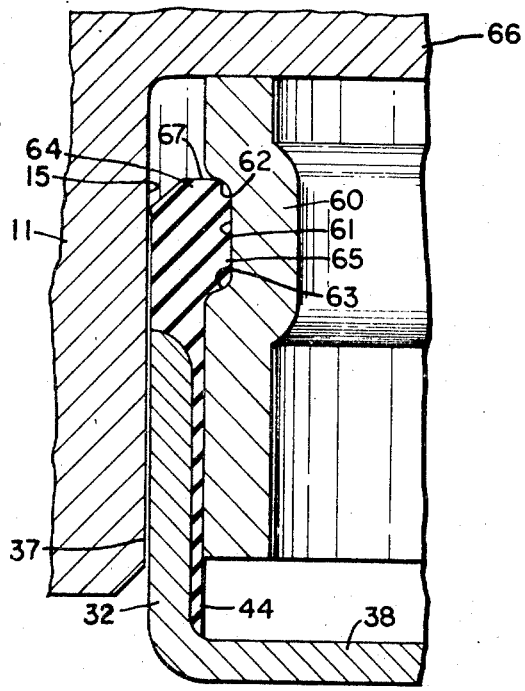
FIG_6
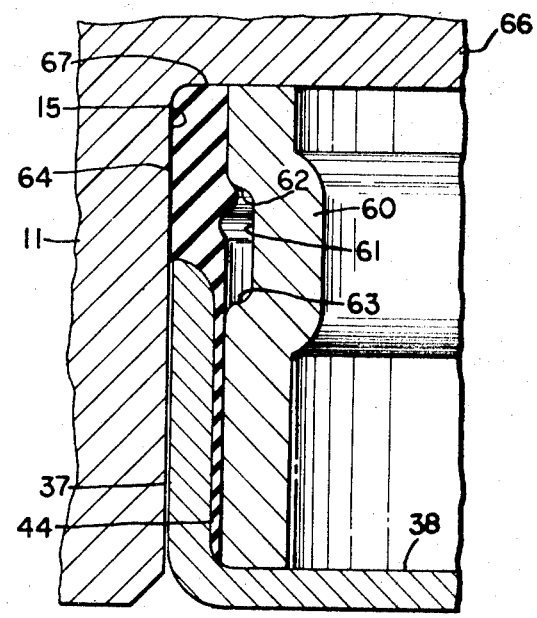
FIG_7
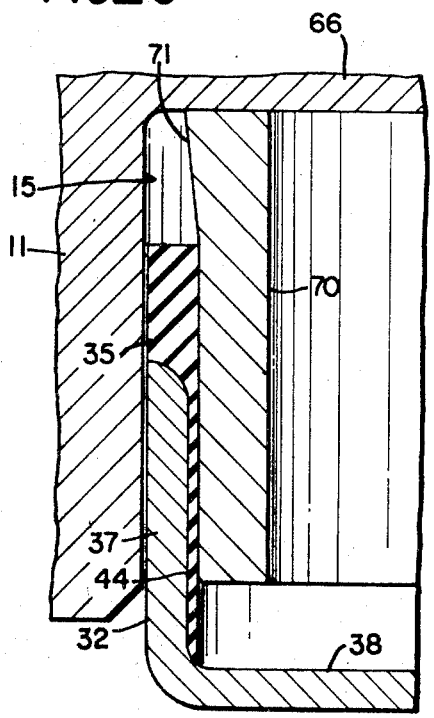
FIG_8
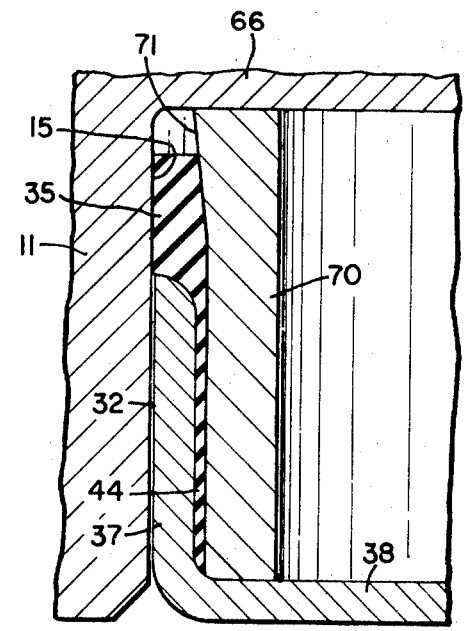
FIG_9

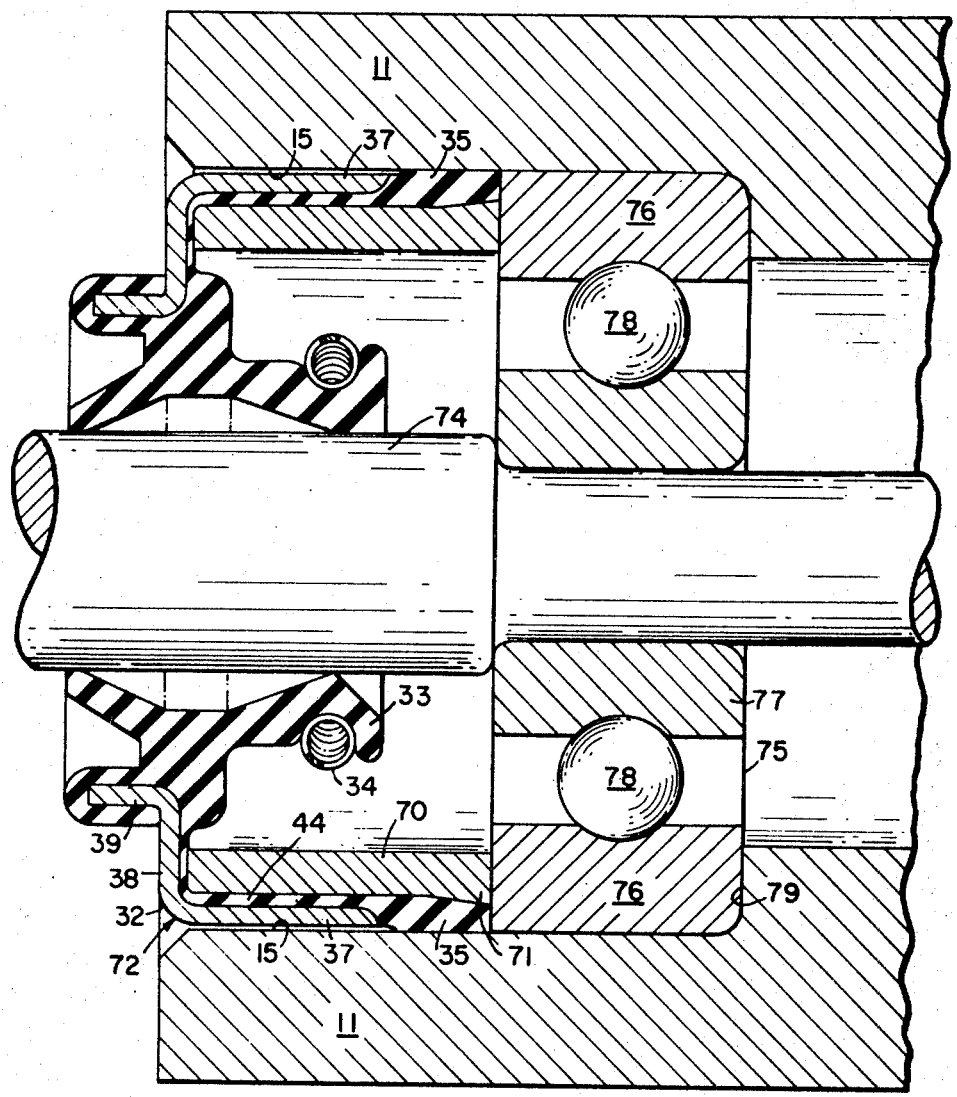
FIG_10

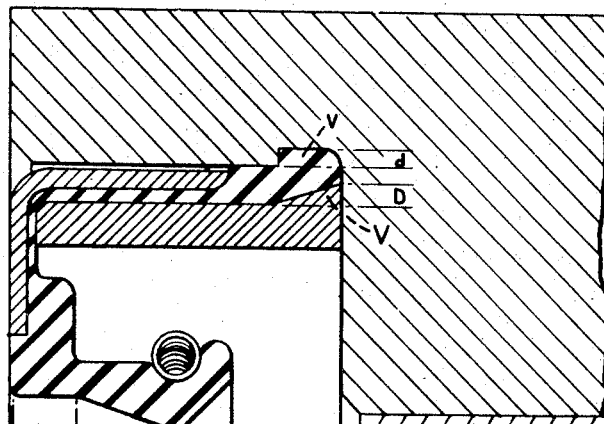
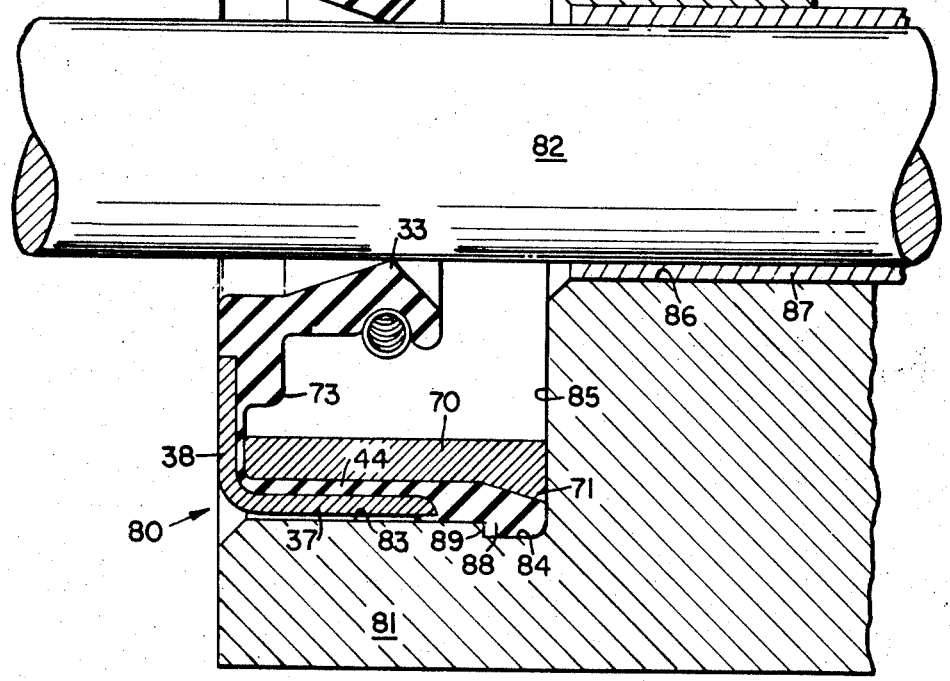
FIG_11
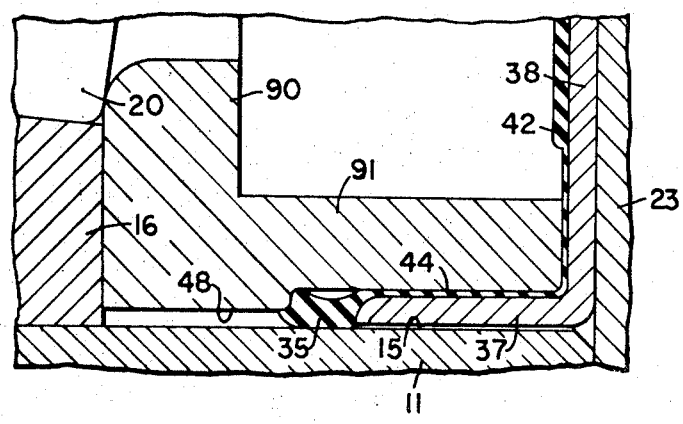
FIG_12
INVENTORS
ALFRED S. BERENS
DEAN R. BAINARD
GEORGE L. CORSI
ATTORNEYS

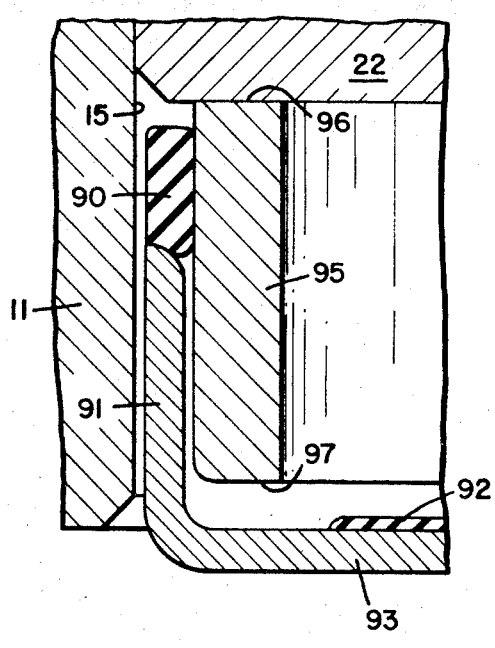
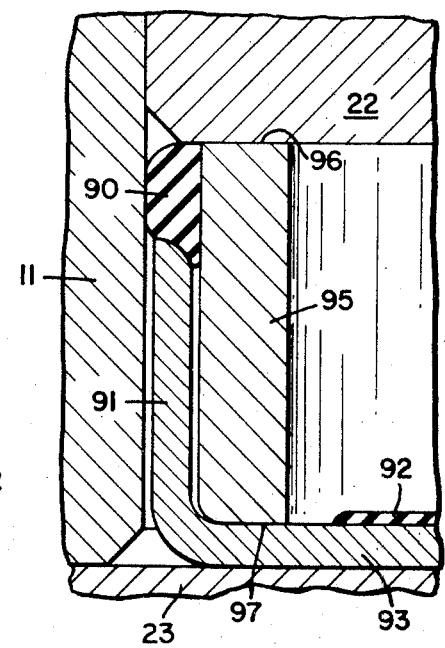
FIG_13     FIG_14

SHAFT SEAL WITH EXPANDABLE OUTER PERIPHERY

This application is a division of application Ser. No. 12,563 filed Feb. 19, 1970, now U.S. Pat. No. 3,614,183.

This invention relates to an improved seal of a radial shaft-sealing type, wherein the outer periphery is expanded to seal in a bore.

The seal of this invention has many uses in many environments. For example, it solves some of the problems that have resulted when ball bearings in the rear axles of automotive vehicles are replaced by roller bearings, generally tapered. Special types of roller bearings have been designed to withstand the forces involved, and these have required a change in the shaft sealing means that must be used outside the roller bearings to prevent leakage of oil. The outer race of this new type of roller bearing makes a slip fit in the axle tube or housing, and an axial load has to be applied to the bearing's outer race in order to clamp the bearing in place. The load may be obtained by deflecting a hard retainer plate, and the load is transmitted from the retainer plate to the bearing's outer race through a shaft seal assembly of the present invention. As a result, in this instance, the shaft seal assembly becomes a structural member of the rear axle assembly. In order to transmit such a load properly, the seal case of this invention makes a slip fit with the axle tube; a separate rigid ring slides freely inside the seal case and cooperates with the case to offer full support to the bearing, for transmission of the force from the retainer plate to the bearing. Since the case makes a slip fit in the axle tube instead of the press fit heretofore employed in most axle seals, it is important to provide means for sealing against leakage between the seal case and the axle tube, and this sealing means must be capable of accepting the wide dimensional variation that tends to be caused by a piling up of the tolerances in the axle tube, the bearing retainer plate, and the other parts concerned. Also, it is important for the shaft seal itself to transmit sufficient pressure to the bearing at an effective location. Of course, the seal must still perform its standard function of sealing against the leakage of oil between the stationary axle tube and the rotating axle. Also, since axial space is at a premium, the seal must do this in a distance compatible with its additional function of keeping the bearing properly loaded.

There are other installations where the bore seal requires that the seal outer periphery be expanded, and in all these installations the present invention may be used.

Briefly considered, the seal of the present invention incorporates a rigid metallic case or reinforcing member having a radial flange and a generally cylindrical portion which is used for slip-fit engagement of the bore. The radial flange supports the shaft seal and the generally cylindrical portion supports a cylindrical elastomeric gasket of the same outer diameter, which extends within the bore beyond the end of the metallic cylindrical portion. A separate stepped rigid ring slip fits inside the case, and the step engages the end of the cylindrical elastomeric gasket, and has approximately the same outer diameter as the gasket and the cylindrical portion of the case, so that it, too, is slip-fitted into the bore. The outer end of the ring engages some type of fixed support in the bore (such as the outer race of a bearing or a step in the bore, and its length is so proportioned that when the seal is pushed into place, the inner end of this ring is brought into engagement with a portion of the radial flange of the seal case. This relative movement exerts pressure on the gasket, which can flex only outwardly and therefore engages the bore wall and serves to gasket between the bore wall and the seal case, preventing any leakage of oil there.

One form of the invention must be held in place by a retainer plate, while other forms of the invention are self-retaining.

Other objects and advantages of the invention will appear from the following description of the preferred form thereof.

In the drawing:

FIG. 1 is a fragmentary view in side elevation and in section of an automatic rear axle installation involving the principles of the invention.

FIG. 2 is a view in end elevation of a seal assembly embodying the principles of the invention and employed in the combination of FIG. 1, a portion of the separate ring being broken away in order to expose the gasket.

FIG. 3 is an enlarged view in section taken along the line 3—3 in FIG. 2.

FIG. 4 is a fragmentary enlarged view in section of a seal ring portion installed in a bore and lightly brought into contact with a bearing.

FIG. 5 is a similar view with a retainer plate in place, forcing the ring toward the case radial flange and expanding the gasket into sealing engagement with the bore wall.

FIG. 6 is a view similar to FIG. 4 of a modified form of the invention, which is self-retaining in the bore, needing no retainer plate.

FIG. 7 is a view similar to FIG. 5 of the device of FIG. 6.

FIG. 8 is a view similar to FIG. 4 of another modified form of the invention.

FIG. 9 is a view similar to FIG. 5 of the device of FIG. 8.

FIG. 10 is a view similar to FIG. 1 of an installation employing a structure basically similar to that of FIGS. 8 and 9 in association with a ball bearing.

FIG. 11 is a view similar to FIG. 10 of another modified form of the invention in an assembly incorporating a sleeve bearing.

FIG. 12 is a fragmentary enlarged view in section of yet another modified form of the invention, in which the separate ring is combined with the bearing thrust ring, thus becoming part of the bearing.

FIG. 13 is a view similar to FIG. 4 of yet another modified form of the invention.

FIG. 14 is a view similar to FIG. 5 of the device of FIG. 13.

FIG. 1 shows an installation wherein the invention is used in the rear axle of an automotive vehicle, in conjunction with a roller bearing. An axle 10 extends inside an axle tube 11 and is separated from the axle tube 11 by a tapered roller bearing 12. (A non-tapered roller bearing may, where desired, be substituted.) The axle tube 11 is provided with an inner bore 13 which is stepped at a shoulder 14 to a wider outer bore 15. The shoulder 14 provides a seat for the outer race 16 of the roller bearing 12. The axle 10 also has a shoulder 17 stepped outwardly to a contour portion 18, to provide a seat for the inner race or cone 19 of the roller bearing 12. Between this cone 19 and the outer race 16 are the tapered rollers 20, spaced by a cage 21. The roller bearing 12 shown is an improved design, having a guard and thrust ring 22 which extends radially inwardly at the outer end of the rollers 20 and is preferably affixed to the outer race 16, helping to limit their axial movement and unitizing the bearing assembly into a single, complete package for ease of handling during storage and installation. The thrust ring 22 need not be structurally affixed to the outer race 16; it may be "tacked" or spot welded for convenience of assembly. To assure that this type of bearing works properly, thrust must be exerted against the thrust ring 22, and this thrust may be provided by a hardened retainer plate 23 which is secured by a series of bolts 24 to a heavy flange 25 that is welded to the axle tube 11, with a brake-backing plate 26 therebetween. The plate 23 may be stepped outwardly by an axial portion 27 to provide a suitable seal guard 28. The plate 23 bears against a seal assembly 30 of this invention, which, in addition to performing its usual shaft-sealing function, has to transmit the thrust from the plate 23 to the ring 22 and to provide a seal with the bore 15, although it cannot be press-fitted into the bore 15, because then the seal assembly 30 would not transmit the full thrust from the retainer plate 23 to the outer race 16 of the bearing 12; in order to transmit this thrust properly, the seal assembly 30 must be loose in the bore 15.

A novel seal assembly 30 of this invention may take the form in FIGS. 1–5, where it preferably comprises two main elements: (1) a shaft-sealing unit 31 having a metal case 32, an elastomeric sealing member 33, a lip-pressure-exerting spring 34 and a bore-sealing flexing gasket 35, and (2) a rigid ring 36. The metal case 32 is preferably made from sheet metal and has a cylindrical portion 37 leading to an inwardly extending radial portion 38, terminating at its inner end in an anchor portion 39, to which the elastomeric member 33 is molded and bonded.

The cylindrical portion 37 is enough smaller in diameter than the bore 15 of the axle tube 11 to give a slip fit therein; this is not usual practice for a shaft seal, for it is usually press-fitted, in order to seal against passage of oil between itself and the bore, but the slip-fit is important in this instance, in order to transmit the thrust forces from the retainer plate 23 to the bearing's outer race 16.

It is still important, of course, to avoid leakage between the cylindrical case portion 37 of the shaft seal 30 and the bore 15 of the axle tube 11. For this purpose, the case 32 is provided with the gasket 35 that extends a substantial distance beyond the cylindrical case portion 37. Preferably, the gasket 35 is made from the same elastomer and is molded at the same time as the member 33, being connected to it necessarily by a thin coating of elastomer 42, and even thinner coatings 43 and 44. The gasket 35 has a smooth outer periphery 40, preferably the same outer diameter as the case portion 37, and has a substantially flat terminal edge 41. As a result of the preferred molding of the elements 33 and 35 at the same time, the inner face of the radial flange 38 may have the thin elastomeric coating 42 and the even thinner coating portion 43, like flashing. So far as the invention is concerned, the coatings 42 and 43 need not be present, for they play no vital role, but they can be present without causing trouble.

The ring 36 may be made of any suitable rigid material, including oil-resistant plastics and metal. When made of a rigid plastic, it is possible to mold the ring 36, and this has advantages. The ring 36 is made to provide a flat face 45, which bears against the thrust ring 22, and a flat face or toe 46 at the other end bears on the thin coating 43, so that it transmits force to or from the radial flange 38 when the installation is completed. However, the length of the ring 36, along its cylindrical axis, is such that until the retainer plate 23 is installed, the face 46 is not in contact with the thin coating 43. The ring 36 has a step 47 connecting an outer cylindrical surface 48 to a smaller diameter cylindrical surface 49. The surface 49 is small enough in diameter to slide smoothly in a slip-fit relationship along the inner surface of the elastomeric gasket 35 and the coating portion 44 that may line the cylindrical flange 37, and the outer surface 48 is small enough in outer diameter to provide a slip fit within the axial bore 15. The surface 48 may have approximately the same outer diameter as that of the gasket 35 and the cylindrical case portion 37, or it may be slightly smaller in diameter, as shown here. This is not critical. The step 47, however, does engage the terminal edge 41 of the gasket 35.

As FIG. 4 shows, when the installation is first made, there is no sealing between the sealing unit 31 and the bore 15, and the toe 46 of the ring 36 is not in contact with the coating 43 on the radial flange 38. The length of the smaller-diameter surface portion 49, however, between the step 47 and the toe 46 is made shorter than the distance between the terminal edge 41 of the unflexed gasket 35 and the thin rubber coating 43, and equal to the distance between the edge 41 and the flange 38 when the gasket 35 is fully flexed, as in FIG. 5. The ring 36 rests snugly against the thrust ring 22, but no force is yet exerted by the ring 36 on the ring 22.

When the retainer plate 23 is put in place, it engages the radial flange 38 and pushes the seal unit 31 toward the bearing 12. The rigid cylindrical portion 37 is then moved closer to the thrust ring 22. Continued movement of the portion 37 toward the thrust ring 22 forces the gasket 35 to flex, for its terminal edge 41 is already lodged against the step 47. Since the gasket 35 is fully supported by the ring surface 49 on its inner periphery, the gasket 35 can only flex outwardly, approximately as shown in FIG. 5, so that it comes into sealing engagement with the bore 15. Shortly after it has reached its sealing position and the seal is quite certain, the toe 46 not only engages the flange portion 43 but bears on it sufficiently to ensure a good transmission of force from the retaining member 23 through the flange 38 and the ring 36 to the thrust ring 22. Thus, both the missions are accomplished in this form of the invention. The bearing 12 is fully supported and is given the force necessary to hold it together and keep urging it inwardly, and a seal is made between the axial bore 15 and the seal assembly 30, so that no oil can leak around the seal assembly 30.

In installation, as shown in FIG. 1, the retainer ring 23 and the seal unit 30, comprising the seal unit 31 and the ring 36, and the roller bearing 12 are placed on the axle 10. When the axle 10 is installed, the bearing 12 engages, by slip fit, the axle tube 11, the axle 10 being moved in until the bearing 12 engages the shoulder 14. The thrust ring 22 is a component of the bearing 12 and is already in place. Then, the seal assembly 30 is secured in place by the retainer ring 23, thereby sending thrust against the radial flange 38 to move the seal case 32 inwardly toward the thrust ring 22, and thus into eventual contact with the rigid ring 36, through which the force is transmitted from the retainer ring 23 to the thrust ring 22 and the roller bearing 12. During this movement, the gasket 35 is flexed into its sealing position against the bore wall 15 so that there can be no leakage around the seal assembly.

While the form of the invention shown in FIGS. 1–5 and just described is a preferred one, other forms are possible within the scope of the present invention. In the form of the invention shown in the fragmentary views FIGS. 6 and 7, the same general components are employed, but in different configuration, so that here no external retainer plate is needed, for this device is self-retaining. Here, the rigid ring 60, which may be formed from sheet steel, is formed to provide a recess 61 providing a double step, a step-in 62 and a step-out 63. A gasket 64 has an inwardly extending inner rim portion 65 normally filling the recess 61 and retained there under unflexed conditions. The installation does not require any retaining plate; the case 32 is forced manually or otherwise toward the bore shoulder 66 and results in the action shown between FIG. 6 and FIG. 7. The gasket rim 65 is sprung entirely out of the annular recess 61 and its terminal edge 67 engages the bore shoulder 66, and it is forced against the axial bore 15 to seal quite tightly, while being retained there by the ring 60. The axial length of the unflexed gasket 64, plus the axial length of the case portion 37 are in this embodiment equal to or slightly greater than the axial length of the ring 60. The axial length of the ring 60 is equal to the sum of the axial length of the case portion 37, plus the flexed length of the gasket 64. The forcing outwardly of the rim portion 65 is sufficient to provide the needed sealing action, and no reliance need be made on the gasket 64 coming into contact with the bore shoulder 66.

Another modified self-retaining form of the invention is shown in FIGS. 8 and 9. In this instance, a rigid ring 70 is tapered instead of stepped. The gasket 35 may be identical to that of FIGS. 1–5. The length of the ring 70 and the angle of its taper 71 are such that when the seal is in its fully engaged position, the taper 71 forces the gasket 35 into a very adequate and self-retaining sealing contact against the bore 15.

FIG. 10 shows an installation incorporating a seal 72 having a structure like that of FIGS. 8 and 9. The rigid ring 70 bears on the thin elastomeric coating 43, and its taper 71 forces the gasket 35 into a self-retaining sealing contact against the bore wall 15. The lip 33 seals on the shaft 74. Thus, unlike the assembly of FIG. 1, there is no retaining plate 23, for none is needed. The seal 72 could be used with the tapered roller bearing 12 of FIG. 1, or with other types of bearings, but, by way of example, a ball bearing 75 is shown in FIG. 10, including an outer race 76, an inner race 77 and a series of balls 78. The outer race 76 bears directly on the rigid ring 70 and transmits thrust between the rigid ring 70 and a shoulder 79 in the bore 11. The shaft 74 is also stepped, as shown.

FIG. 11 shows another self-retaining installation, incorporating a modified form of seal 80 in a housing 81 and sealing with its lip 33 on a shaft 82. The housing has a bore portion 83 with an annular groove 84 and is stepped in at 85 to a bore portion 86 that receives a sleeve bearing 87 in which the shaft 82 is journaled. The rigid ring 70 is the same as in FIGS. 8–10 and has a taper 71 that acts on a flexible gasket 88, and when the seal 80 is pressed in, the taper 71 forces the gasket 88 to fill the groove 84. The gasket 88 has a shoulder 89 that prevents withdrawal of the seal 80. The difference in outer diameter between the beginning of the taper 71 and its end is shown at $D$, while the depth of the groove 84 is shown at $d$. In this structure $D > d$, and in fact $D$ is sufficiently greater than $d$ so that the volume $V$ taken up by the metal taper 71 is greater than the volume $v$ in the groove 84. When $V > v$ pressure is created to hold the seal in place, so that there is pressure holding the gasket 88 in the groove 84 and preventing withdrawal.

So far as structure of the seal proper is concerned, the seals in FIGS. 5 and 12 are identical. However, in FIG. 12, the rigid ring is not a completely independent member. Here the bearing's thrust ring 90 has an annular extension 91 serving as the rigid ring. Thus, the rigid ring 91 is still a separate member from the seal, but it is part of the bearing. Where the bearing and seal are made for each other, this basic idea can be employed. The rigid ring, thus may be part of some other part that is distinct from the seal.

FIGS. 13 and 14 show (in views like FIGS. 4 and 5) the pertinent portions of another modification of the invention. Here, the gasket 90 and its supporting case portion 91 are the same as the gasket 35 and case portion 37 in FIGS. 4 and 5, except that the gasket 90 is isolated from the seal elastomer 92. The gasket 90 may be either a separate molding or a "flow on" gasket of a different material. The flange 93 is like the flange 38. The difference lies in a different rigid ring 95 which has no shoulder or taper but is of substantially cylindrical shape. The ring 95 merely acts as a restraining member forcing the gasket 90 to flex out against the bore wall 15 when the ring 95 and the gasket 90 are approximately simultaneously forced against the thrust ring 22 (or the bearing's outer race). In this instance, the ring 95 has its edges 96 and 97 abut the thrust ring 22 and the flange 93, but it is shorter than the length of the flange 91 plus the gasket 90 by the amount needed for proper flexing of the gasket 90.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A rotary seal unit having an expandable outer periphery, including in combination:
   a rigid reinforcing case having a cylindrical portion with a free end and a radially inwardly extending flange, elastomeric seal means supported by said case and having shaft-engaging lip means at a radially inner peripheral portion, a flexible gasket generally cylindrical and generally in line with and extending axially beyond and supported by said cylindrical case portion, and a rigid ring having a face at one end of a generally axially extending portion, with means enabling axial movement of said face relative to said case toward said radially extending flange and providing means on said generally axially extending portion for forcing said gasket to flex outwardly when said relative movement is completed to provide a static bore seal.

2. The seal unit of claim 1 wherein said flexible gasket is truly cylindrical and has the same outer periphery as said case's cylindrical portion and terminates in a terminal edge.

3. The seal unit of claim 2 wherein said generally axially-extending portion of said rigid ring is stepped radially outwardly to provide a shoulder against which said terminal edge abuts, the step leading from an inner cylindrical portion that is slip-fits within said cylindrical portion of said case and said gasket, to an outer cylindrical portion with a diameter no greater than that of said cylindrical portion of said case.

4. The seal unit of claim 2 wherein the generally axially extending portion of said rigid ring has a cylindrical portion lip-fitting in and supporting said gasket and an outwardly tapered portion that flexes said gasket outwardly during said relative movement.

5. The seal unit of claim 2 wherein said rigid ring is cylindrical and is shorter than the length of the cylindrical portion plus the length of said gasket, said rigid ring preventing inward flexing of said gasket.

6. The seal unit of claim 1 wherein said gasket has an annular inwardly extending rim portion and said generally axially extending portion of said rigid ring has a supporting recess in which said rim portion fits and two larger diameter cylindrical portions on each side of said recess for forcing said gasket outwardly when said rim portion is displaced from said recess.

7. The seal unit of claim 1 wherein said rigid ring is proportioned to transmit force from said radially extending flange only after having forced said gasket out into the gasket's bore-sealing position.

8. The seal unit of claim 1 wherein said rigid ring is a portion of a bearing which the seal unit is to protect.

* * * * *

UNITED STATES PATENT OFFICE
CERTIFICATE OF CORRECTION

Patent No. 3,743,305　　　　　　　　Dated July 3, 1973

Inventor(s) Alfred S. Herens, Dean R. Bainard & George L. Corsi

It is certified that error appears in the above-identified patent and that said Letters Patent are hereby corrected as shown below:

Col. 2, line 8, "the bore wall" should read --that bore wall--

Col. 2, line 16, "drawing" should read --drawings--

Col. 2, line 18, "automatic" should read --automotive--

Col. 7, line 2, "shaftiengaging" should read --shaft-engaging--

Col. 7, line 23, "slip-fits" should read --slip-fit--

Signed and sealed this 20th day of November 1973.

(SEAL)
Attest:

EDWARD M. FLETCHER, JR.　　　　　RENE D. TEGTMEYER
Attesting Officer　　　　　　　　　Acting Commissioner of Patents